United States Patent [19]
Mokdad

[11] Patent Number: 5,771,756
[45] Date of Patent: Jun. 30, 1998

[54] DOUBLE DAMPING FLY-WHEEL

[75] Inventor: Ayman Mokdad, Saint-Ouen, France

[73] Assignee: Valeo, Paris, France

[21] Appl. No.: 652,491

[22] PCT Filed: Sep. 22, 1995

[86] PCT No.: PCT/FR95/01222

§ 371 Date: May 28, 1996

§ 102(e) Date: May 28, 1996

[87] PCT Pub. No.: WO96/10139

PCT Pub. Date: Apr. 4, 1996

[30] Foreign Application Priority Data

Sep. 26, 1994 [FR] France .................................. 94 11434

[51] Int. Cl.[6] .................................................. F16F 15/10
[52] U.S. Cl. ................................ 74/574; 74/572; 464/24; 464/68
[58] Field of Search ........................ 74/572–574; 60/338; 464/24, 68; 192/106.2

[56] References Cited

U.S. PATENT DOCUMENTS

| 2,674,863 | 4/1954 | Thelander ................................. 464/68 |
| 2,826,902 | 3/1958 | De Coursey .............................. 464/68 |
| 4,148,200 | 4/1979 | Schallhorn et al. ............. 192/106.1 X |
| 4,232,534 | 11/1980 | Lamarche .............................. 192/106.2 |
| 4,351,167 | 9/1982 | Hanke et al. ............................. 464/24 |
| 4,674,991 | 6/1987 | Tojima et al. ............................ 464/24 |
| 5,384,948 | 1/1995 | Bonfilio et al. ....................... 74/574 X |
| 5,385,018 | 1/1995 | Kohno et al. ............................. 60/338 |

FOREIGN PATENT DOCUMENTS

| 0002581 | 6/1979 | European Pat. Off. . |
| 0427983 | 5/1991 | European Pat. Off. . |
| 0555817 | 8/1993 | European Pat. Off. . |
| 2565650 | 12/1985 | France ................................. 74/573 R |
| 2658880 | 8/1991 | France . |
| 2695579 | 3/1994 | France . |

OTHER PUBLICATIONS

Patent Abstracts of Japan vol. 13 No. 469 (M–883), 24 Oct. 1989. JP,A,01 182651 Jul. 20, 1989.

Primary Examiner—Vinh T. Luong
Attorney, Agent, or Firm—Longacre & White

[57] ABSTRACT

A double damped flywheel having two coaxial masses. A first mass is fixed to a driving shaft of a central portion (20) made of sheet metal and a peripheral massive portion (22) connected to the periphery of the central portion.

5 Claims, 1 Drawing Sheet

FIG. 1
FIG. 2
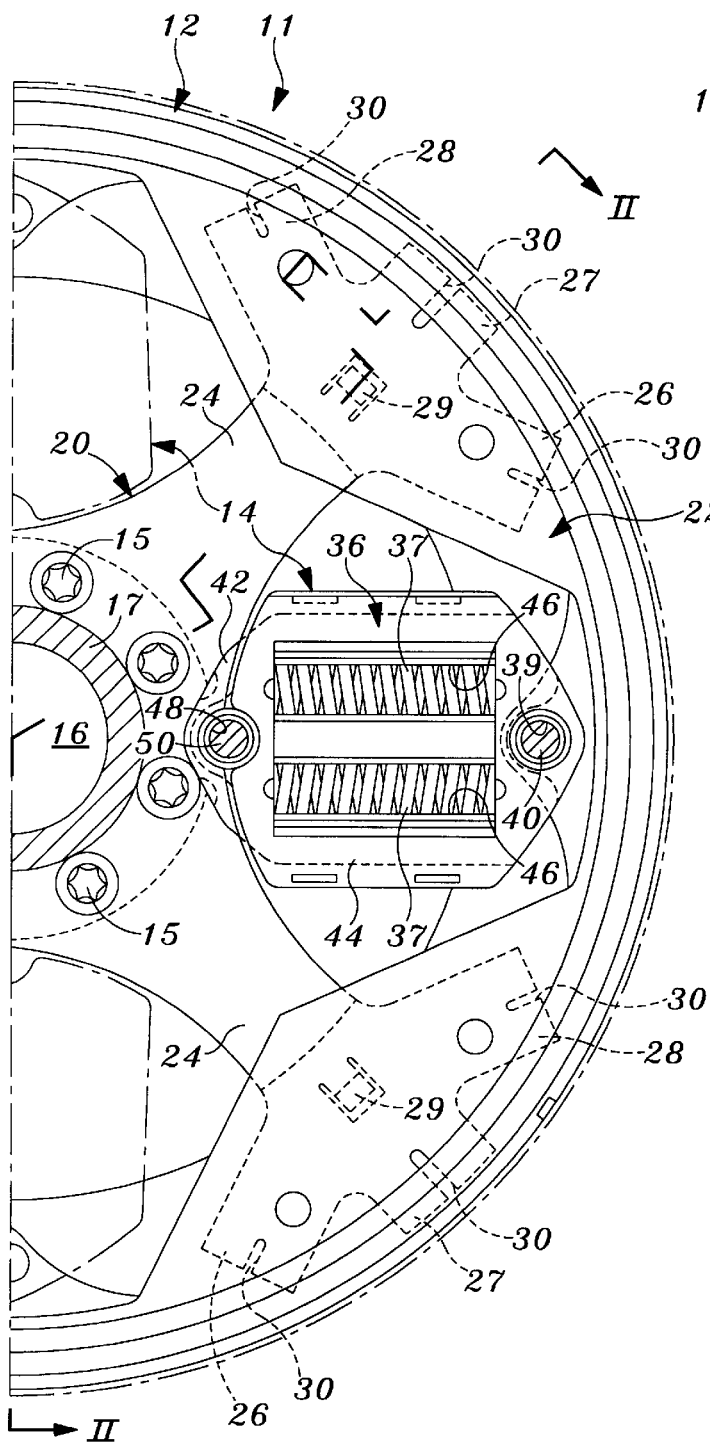
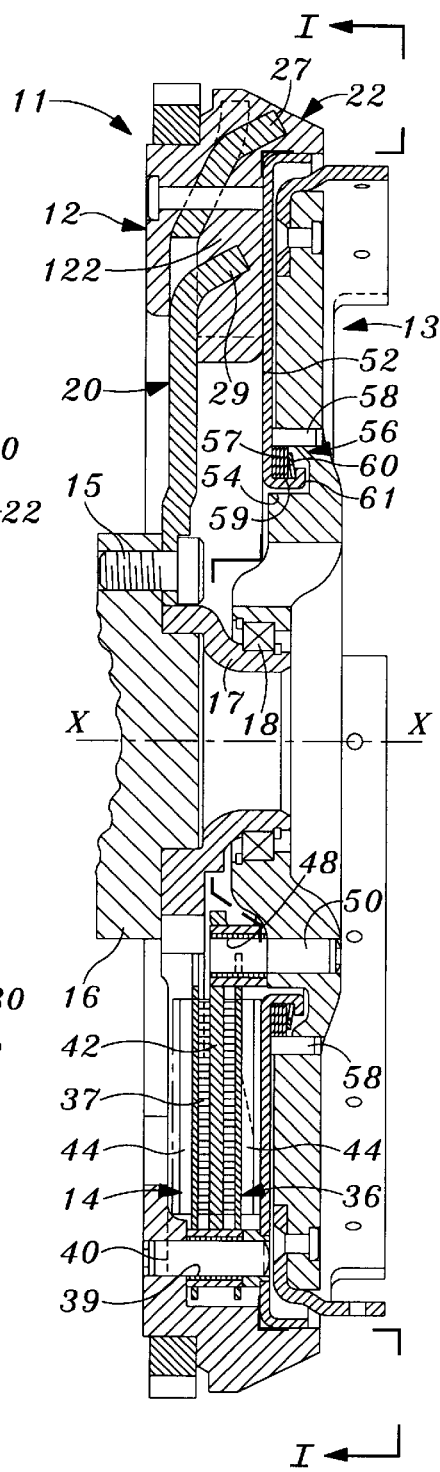

DOUBLE DAMPING FLY-WHEEL

BACKGROUND OF THE INVENTION

1. Field of the Invention

The present invention relates to a damping flywheel and more particularly a double damping flywheel of the type comprising two coaxial masses movably mounted circumferentially in relation to one another, in opposition to resilient means.

2. Description of the Prior Art

Such a damping flywheel, especially for a motor vehicle, is described for example in document FR-A-2 565 650. One of the masses, hereinafter called "first mass", is intended to be fixed to a driving shaft whereas the other mass, hereinafter called "second mass", generally comprises a reaction plate for a friction clutch. The masses in question may be made of cast material, for example of cast iron. Depending on the complexity of the device, casting is relatively difficult to perform, especially that of the first mass.

SUMMARY OF THE INVENTION

The invention more particularly relates to an improvement of the said first mass, i.e. that which has to be fixed to the driving shaft, enabling it to be made in a simpler and more economical manner.

More precisely, the invention relates to a damping flywheel, especially for a motor vehicle, of the type comprising two coaxial masses movably mounted circumferentially in relation to one another in opposition to resilient means, in which one of the masses is intended to be fixed to a driving shaft, characterised in that this mass is essentially formed of a central portion made of sheet metal intended to be fixed to said driving shaft and of at least one massive portion, having a generally annular shape, mounted on the outer periphery of the said central portion.

This massive portion is made of sheet metal and the central portion comprises peripheral lugs inserted at the heart of the solid portion. The lugs are defined at the ends of radial arms of the central portion.

The invention will be better understood and other advantages thereof will become clearer in the light of the following description of a possible embodiment of a damping flywheel in accordance with its principle, given merely by way of example and made with reference to the attached drawings in which:

BRIEF DESCRIPTION OF THE DRAWINGS

FIG. 1 is an axial half-section of a double damping flywheel in accordance with the invention, seen along the line I—I of FIG. 2; and FIG. 2 is a half-section II—II of the damping flywheel of FIG. 1.

DETAILED DESCRIPTION OF THE PREFERRED EMBODIMENT

On the drawings a device is represented which forms a double damping flywheel 11 for a motor vehicle comprising two coaxial parts mounted movably in relation to one another in opposition to resilient damping means 14. This device is mounted on the shaft of the engine of a motor vehicle. The two parts form coaxial masses rotating around an axis of symmetry X—X, which is also the common axis of rotation of a driving shaft 16, here the crankshaft of the internal combustion engine, of a partially represented clutch and of a primary shaft of a gearbox, not represented.

A first rotating mass 12 is connected, here by screws 15, situated in the vicinity of its inner periphery to the driving shaft 16, whereas a second rotating mass 13 is coupled in a disengagable manner by means of the clutch pressure plate mechanism (not represented) to the primary shaft of the gearbox. The second mass 13 is rotationally mounted on a tubular hub 17 of the first mass 12 by means of a rotating bearing here formed of a ball bearing 18. The second mass 13 forms the reaction plate of the clutch mentioned above in a conventional manner.

According to a notable characteristic of the invention, the said first mass 12 essentially consists of a central portion 20, made of sheet metal, welded to the hub 17 and fixed to the driving shaft 16, and of a massive portion 22, made of cast metal, here having a generally annular shape, connected to the outer periphery of this central portion 20, here in the form flange. More precisely, the latter comprises radial arms 24 equipped with peripheral lugs 26, 27, 28 inserted at the heart 122 of the massive portion. The shape of these lugs (which define a type of cross at the end of each radial arm) can be seen in particular on FIG. 2.

An additional lug 29 is obtained by making a U-shaped cut in the radial arm and edge-forming the metallic part customised in this manner. Moreover, each lug comprises a slit 30 dividing it into two parts, which are curved one in relation to the other. Generally, the lugs are curved at the heart 122 of the massive portion, as is clear from FIG. 2. In fact, the said massive annular portion 22, according to the invention, is cast at the outer periphery of the said central portion 20, i.e. on all the lugs 26–29 defined at the ends of the four radial arms 24 of the said central portion. This casting operation produces a sort of weld between the lugs, which are softened at the moment of casting, and the solid part of sheet metal.

The above-mentioned resilient means 14 are here formed by four cassettes 36 sheltering springs 37 which here act generally radially between the two masses. Each cassette comprises a bearing 39 engaged on a journal 40 integral with the first mass 13, more particularly mounted in an axially oriented hole of the said massive portion 22. The cassette itself, which is relatively flat axially, shelters two helical springs 37 and a central disc 42 provided with cutouts enabling the said springs to be housed. The walls 44 of the cassette connected to one another by their lateral edges, here by stapling, as a variant by welding, form two parallel guide portions for the springs, they are provided with windows 46 with longitudinal edges bent: outwardly, and placed opposite cutouts, here windows, of the disc. These two walls are integral with the bearing 39 engaged on the journal 40. The disc 42 is integral with a bearing 48 mounted in the vicinity of its radially innermost end and this bearing is engaged on a bearing journal 50 mounted in the thickness of the said second mass 13. The springs 37 are biased between one end of the cassette and the disc. This arrangement of the resilient means with cassettes does not directly form part of the invention and will therefore not be described in any further detail.

As a reminder, it will be mentioned in operation that the cassettes 36 become inclined with the compression of the generally radially acting springs 37.

Moreover, the said massive portion 22 is equipped, on the side of the second mass, with a cover 52, made of sheet metal, extending radially towards the interior to close the cavity in which the cassettes are housed. This cover 52 comprises a substantially cylindrical portion 54 at its inner periphery which serves as a support to a dry friction arrangement 56 formed of a friction washer 57 rotationally attached to the said second mass by pins 58, of a support washer 59 rotationally attached to the cover 52 and of a Belleville washer 60 mounted with mechanical bias between the support washer 59 and lugs 61 bent at the end of the cylindrical part 54 of the cover 52. The journal 40 is also integral with the cover 52.

In operation, the friction washer 57, clamped between the plate 52 and the support washer 59 under the action of the washer 60, rubs against the faces concerned of the plate 52 and of the support washer 59 here having at its inner periphery lugs engaged in slots formed in the cylindrical portion 54.

Of course, the hub 17 may be in a single piece with the central flange 20, which has clearance openings (not provided with references) at the level of the cassettes 36. The robust nature and the simplicity of the first mass 12 will be appreciated. It will be appreciated that the cassettes 36 have a great length as they are hinged at the inner periphery of the second mass and at the outer periphery of the first mass.

Moreover the bearing 18 is of a small size with the result that the second mass 13 may be provided with holes allowing access to the screws 15.

Thanks to the invention the ring 22 extends axially protruding in relation to the cental portion 20 and in relation to the two faces of the central portion 20, which enables the inertia to be increased in an easy manner whilst occupying the available space in the best way. The arrangement according to the invention is more economical than a welded attachment as described in document EP 0 427 983 or by clinching as described in document FR-A-2 695 579.

It can be seen that, thanks to the invention, the ring 22 is properly suspended at the central portion 20 by virtue of the peripheral lugs 26, 29. A well balanced solution is obtained.

Thanks to the ring made of material suitable for casting, cavities for mounting the cassettes 36 can easily be created.

Thanks to the radial arms 24, a good ventilation of the double flywheel is obtained along with good inertia.

I claim:

1. A damping flywheel comprising: first and second coaxial masses (12, 13) movably mounted circumferentially in relation to one another in opposition to resilient means (14), in which said first coaxial mass (12) is intended to be fixed to a driving shaft (16), said first coaxial mass (12) is formed of a central portion (20) fixed to the driving shaft and of at least one massive portion (22) having an annular shape connected to an outer periphery of the central portion by being mounted on the outer periphery of said central portion and the central portion (20) comprises peripheral lugs (26–29) situated at a heart of the massive portion.

2. A damping flywheel according to claim 1, wherein said lugs (26–29) are defined at ends of radial arms (24) of the central portion.

3. A damping flywheel according to claim 2, wherein the lugs (26–29) are curved at the heart of the massive portion (22).

4. A damping flywheel according to claim 1, wherein the resilient damping means (14) are formed by cassettes (36) acting radially between the first and second coaxial masses (12, 13) and comprising a central disc (42) flexibly mounted on the inner periphery of the second mass (13) forming a reaction plate and two walls flexibly mounted on the outer periphery (of) the massive portion (22).

5. A damping flywheel according to claim 4, wherein the massive portion (22) is equipped on a side of the second mass (13) with a cover (52) for mounting articulated journals (40) of the cassettes (36) to the first coaxial mass.

\* \* \* \* \*